(12) United States Patent
Ikeda

(10) Patent No.: US 9,573,505 B2
(45) Date of Patent: Feb. 21, 2017

(54) MANUFACTURING METHOD FOR VEHICLE SEAT

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventor: Masaya Ikeda, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 93 days.

(21) Appl. No.: 14/309,054

(22) Filed: Jun. 19, 2014

(65) Prior Publication Data

US 2014/0373333 A1    Dec. 25, 2014

(30) Foreign Application Priority Data

Jun. 20, 2013 (JP) .................................. 2013-129139

(51) Int. Cl.
 *B60R 22/26* (2006.01)
 *B60N 2/68* (2006.01)
 *B60R 11/00* (2006.01)

(52) U.S. Cl.
 CPC .............. *B60N 2/688* (2013.01); *B60N 2/682* (2013.01); *B60R 22/26* (2013.01); *B60R 2011/0052* (2013.01); *B60R 2011/0066* (2013.01); *Y10T 29/49826* (2015.01); *Y10T 29/49963* (2015.01)

(58) Field of Classification Search
 CPC ...................... Y10T 29/49963; Y10T 29/49945; Y10T 29/49936; B60N 2/682; B60N 2/68; B60R 2011/0031; B60R 2022/1806; B60R 22/263; B60R 22/26; B60R 2022/18; B60R 2011/0066; B60R 22/00; B60R 2011/0052; F16B 4/004
 See application file for complete search history.

(56) References Cited

U.S. PATENT DOCUMENTS

| 6,053,653 | A | * | 4/2000 | Tanaka | .................. | F16B 5/0275 29/525.11 |
|---|---|---|---|---|---|---|
| 6,929,227 | B2 | * | 8/2005 | Hofmann | .................. | F16B 3/06 248/224.8 |
| 2002/0113423 | A1 | | 8/2002 | Kim et al. | | |

(Continued)

FOREIGN PATENT DOCUMENTS

| CN | 1363487 A | 8/2002 |
|---|---|---|
| CN | 101204944 A | 6/2008 |

(Continued)

OTHER PUBLICATIONS

Chinese Office Action, mailed Jan. 13, 2016 with respect to Chinese Patent Application. No. CN201410280828.7, along with an English translation thereof.

(Continued)

*Primary Examiner* — Jermie Cozart
(74) *Attorney, Agent, or Firm* — Greenblum & Bernstein, P.L.C.

(57) ABSTRACT

A vehicle seat includes a base, a buckle mounted on the base, a mounting member used to mount the buckle on the base, and an intermediate member provided between the base and the buckle. The manufacturing method includes providing an assembled body formed by integrating the buckle, the mounting member, and the intermediate member, and mounting the buckle on the base by combining the assembled body with the base.

4 Claims, 3 Drawing Sheets

(56) References Cited

U.S. PATENT DOCUMENTS

| | | | |
|---|---|---|---|
| 2007/0222272 A1* | 9/2007 | Taylor | B60R 22/26 297/468 |
| 2008/0143093 A1 | 6/2008 | Kojima et al. | |
| 2010/0090515 A1 | 4/2010 | Yamazaki et al. | |
| 2013/0093235 A1 | 4/2013 | Yamazaki et al. | |

FOREIGN PATENT DOCUMENTS

| | | | | |
|---|---|---|---|---|
| CN | 101722879 A | 6/2010 | | |
| DE | 20200271 | 5/2002 | | |
| DE | 10310348 A1 * | 9/2004 | ............ | B60R 22/18 |
| DE | 10348348 A1 * | 5/2005 | ............ | B60R 22/22 |
| DE | 102006059096 A1 * | 6/2008 | ............ | B60R 22/22 |
| DE | 102007043339 A1 * | 3/2009 | ............ | B60R 22/18 |
| DE | 102011112049 A1 * | 3/2013 | ............ | B60R 22/22 |
| EP | 1264745 | 12/2002 | | |
| FR | WO 2006095108 A1 * | 9/2006 | ............ | B60R 22/22 |
| JP | 2874335 | 3/1999 | | |
| JP | EP 1932732 A2 * | 6/2008 | ............ | B60R 22/26 |

OTHER PUBLICATIONS

Office Action issued in China Counterpart Patent Appl. No. 201410280828.7, dated Jun. 24, 2016 , along with an English translation thereof.
Office Action issued in China Counterpart Patent Appl. No. 201410280828.7, dated Dec. 20, 2016.

* cited by examiner

MANUFACTURING METHOD FOR VEHICLE SEAT

INCORPORATION BY REFERENCE

The disclosure of Japanese Patent Application No. 2013-129139 filed on Jun. 20, 2013 including the specification, drawings and abstract is incorporated herein by reference in its entirety.

BACKGROUND OF THE INVENTION

1. Field of the Invention

The invention relates to a manufacturing method for a vehicle seat. Specifically, the invention relates to a manufacturing method for a vehicle seat having a buckle of a seat belt.

2. Description of Related Art

It is widely known that a seat belt is provided in a vehicle seat. In a seat belt, a metallic tongue plate is attached to a belt-like webbing, and the tongue plate is structured to be inserted in and fixed to a buckle. The buckle is supported by, for example, a frame of a vehicle seat. However, more specifically, a form is known in which an anchor plate part of a buckle is fastened to a frame by a bolt or the like (see Japanese Patent No. 2874335). When manufacturing a seat belt in such a form, first of all, a bolt is inserted into the frame and the anchor plate part, and then a nut is screwed to the bolt. Normally, when screwing the bolt and the nut to each other, the nut is turned manually to a desired position, and the bolt is then turned by using an impact wrench to finish. Thus, the frame and the anchor plate part are assembled to each other strongly so as not to move to each other.

SUMMARY OF THE INVENTION

However, the technology described in Japanese Patent No. 2874335 still has room for improvement. In the technology described in Japanese Patent No. 2874335, since the anchor plate part, the bolt, and the nut are mounted on the frame one by one, the assembly operation when mounting the anchor plate part is not very efficient. In addition, the operation was carried out with hands placed on both sides of the frame. Therefore, there was a possible difficulty in carrying out the operation.

The invention provides a manufacturing method for a vehicle seat, by which workability is improved when mounting a buckle on a base used in a vehicle seat.

In a manufacturing method for a vehicle seat according to an aspect of the invention, the vehicle seat includes a base, a buckle mounted on the base, a mounting member used to mount the buckle on the base, and an intermediate member provided between the base and the buckle. The manufacturing method includes providing an assembled body formed by integrating the buckle, the mounting member, and the intermediate member, and mounting the buckle on the base by combining the assembled body with the base.

According to the aspect, when manufacturing the vehicle seat having the base, the buckle mounted on the base, the mounting member used to mount the buckle on the base, and the intermediate member provided between the base and the buckle, steps are taken to provide the assembled body formed by integrating the buckle, the mounting member, and the intermediate member, and mount the buckle on the base by combining the assembled body with the base. Therefore, when fixing and arranging the buckle at a given position, it is not necessary to assemble separate parts together from a scratch, and workability of mounting the buckle on the base is improved. Once the assembled body is assembled in a separate process, it is only necessary to combine the assembled body with the base when mounting the buckle. Therefore, it is possible to reduce work time when mounting the buckle on the base. Since the buckle and the mounting member are integrated, individual members are prevented from being separated from each other during an operation of mounting the buckle on the base. Thus, it becomes easy to mount parts appropriately.

In the above aspect, the assembled body may be combined with the base by rotating the base and the mounting member to each other.

According to the above structure, since the assembled body is combined with the base by rotating the base and the mounting member to each other, it becomes relatively easy to perform the operation of mounting the buckle on the base. Since the assembled body is mounted on the base by rotating the base and the mounting member to each other, it is not necessary to hold each of the members to be mounted, which are combined to be used, on each hand, thereby improving workability. For example, it is possible to carry out the operation by holding the base on one hand, and holding the assembled body on the other hand.

In the foregoing aspect, burring machining may be carried out on the base, the mounting member may be provided with a threaded part, and a portion in which the burring machining is performed may be deformed by the threaded part by rotating the mounting member to the portion in which the burring machining is performed while press-fitting the mounting member, so that the assembled body is combined with the base.

According to the above structure, the burring machining is carried out in the base, the mounting member is provided with the threaded part, and the portion in which the burring machining is performed is deformed by the threaded part by rotating the mounting member to the portion in which the burring machining is performed while press-fitting the mounting member, so that the assembled body is combined with the base. Therefore, the member constituting the base serves as a part to be meshed with the thread of the mounting member, and parts such as a nut are not required. Accordingly, it is possible to reduce the number of parts of the vehicle seat.

According to this aspect, it is possible to improve workability when mounting the buckle on the base used for the vehicle seat.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
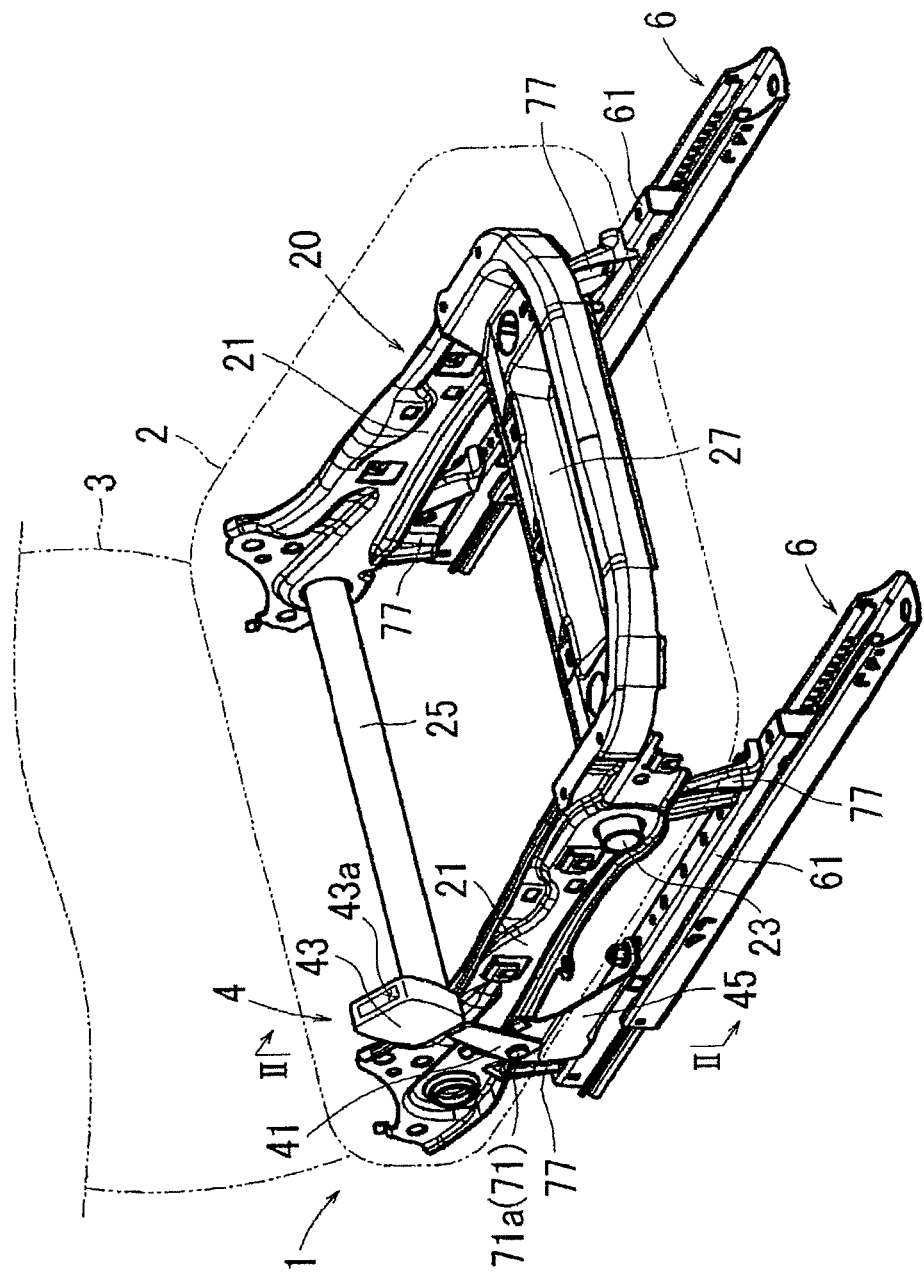
FIG. 1 is a perspective view of a vehicle seat to which the invention is applied.
Figure 3:
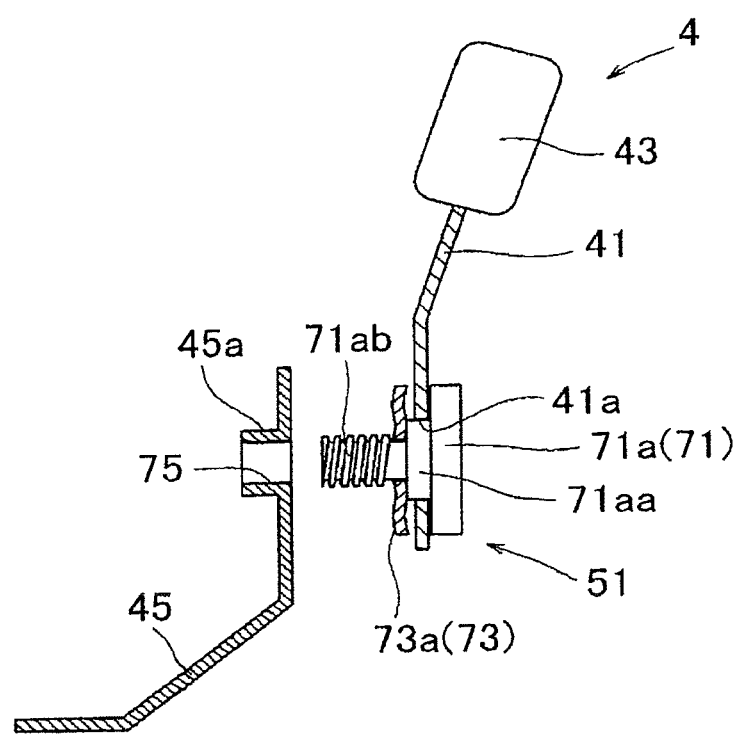
FIG. 3 is a view showing a state before an assembled body is mounted on a buckle bracket.

An embodiment of the invention is explained below with reference to the drawings as appropriate. A vehicle seat 1 in this embodiment is a car seat, and includes a head rest (not shown), a seat back 3, and a seat cushion 2. For the seat back 3 and the seat cushion 2, a frame structured mainly by metal is used as a skeleton. A frame 20, serving as a frame of the seat cushion 2, has lower arms 21 extending in a front-rear direction at left and right positions of the frame 20. A generally cylindrical rear rod 25 is connected to rear sides of the lower arms 21 so that the rear rod 25 is able to turn. A generally cylindrical front rod 23 is connected to front sides of the lower arms 21 so that the front rod 23 is able to turn. A front panel 27 is connected to front side parts of the lower arms 21 (see FIG. 1), and a reclining plate (not shown) is connected to rear ends of the lower arms 21. As the lower arms 21, the rear rod 25, and so on are connected to each other, the frame 20 is formed. Also, the frame 20, serving as the frame of the seat cushion 2, is connected with a back frame (not shown) serving as a frame of the seat back 3, and is mounted on a slide rail mechanism 6 through leg parts 77. A buckle bracket 45 to be connected to a buckle 4 is provided in an upper rail 61 of the slide rail mechanism 6. The buckle bracket 45 is connected to the upper rail 61 through a fastening member. In this embodiment, the buckle bracket 45 serves as a base. As shown in FIG. 3, the buckle bracket 45 has a mounting hole 75 to which a mounting member 71 is inserted. The buckle 4 is fixed to the buckle bracket 45 while being able to move in a turning direction about the mounting member 71. Therefore, an anchor plate part 41 of the buckle 4 is arranged so as to be sandwiched between a head part of the mounting member 71 and the buckle bracket 45, but is also arranged so that a shoulder part 7l as of a shoulder bolt serving as the mounting member 71 is fitted to a through hole 41a of the buckle 4. A washer 73a is arranged between the buckle bracket 45 and the anchor plate part 41 as an intermediate member 73. With this structure, it is possible to provide the vehicle seat 1 in which the buckle 4 is fixed to the buckle bracket 45 serving as the base, so that the buckle 4 is able to turn. In order to form this structure, in this embodiment, when the buckle 4 is mounted, such a method is employed that the structure is roughly divided into the base and the remaining portion other than the base, and the portion other than the base, which is assembled as an assembled body 51, is combined with the base.

Next, a method for forming the assembled body 51 by the buckle 4, the mounting member 71, and the intermediate member 73 is explained. The assembled body 51 is provided with the buckle 4, the mounting member 71, and the intermediate member 73. In particular, the buckle 4 is sandwiched between the mounting member 71 and the intermediate member 73, so that the buckle 4 is not separated from the mounting member 71 easily. In this embodiment, a shoulder bolt, which includes a shoulder part 71aa having a larger diameter than a thread diameter, is employed as the mounting member 71. Further, the washer 73a is employed as the intermediate member 73. The buckle 4 is provided with an insertion part 43 having an insertion hole 43a to which a tongue plate (not shown) is inserted, and the metallic anchor plate part 41. The anchor plate part 41 has the through hole 41a to which the mounting bolt 71a serving as the mounting member 71 is inserted. In order to provide the assembled body 51 of this embodiment, the mounting bolt 71a is inserted into the through hole 41a of the anchor plate part 41, and the shoulder part 71aa of the mounting bolt 71a is fitted to the through hole 41a. After that, the washer 73a serving as the intermediate member 73 is mounted from a threaded part 71ab side of the mounting bolt 71a. In this embodiment, a flat washer that has a flat surface as a whole is not used as the washer 73a, but a wave washer having a shape that is bent in a through axle direction is used. The washer 73a has a projecting portion (not shown) on a radially inner direction, and, because the projecting portion is pressed against the mounting bolt 71a, the washer 73a is engaged by frictional force. The assembled body 51 is formed by assembling and integrating the mounting bolt 71a, the buckle 4, and the washer 73a with each other for the purpose of improving efficiency of assembly. Therefore, it is not necessary to strongly fix the mounting bolt 71a and the washer 73a to each other so much. It is only necessary that the mounting bolt 71a and the washer 73a are not separated from each other easily during the assembly operation.

Figure 2:
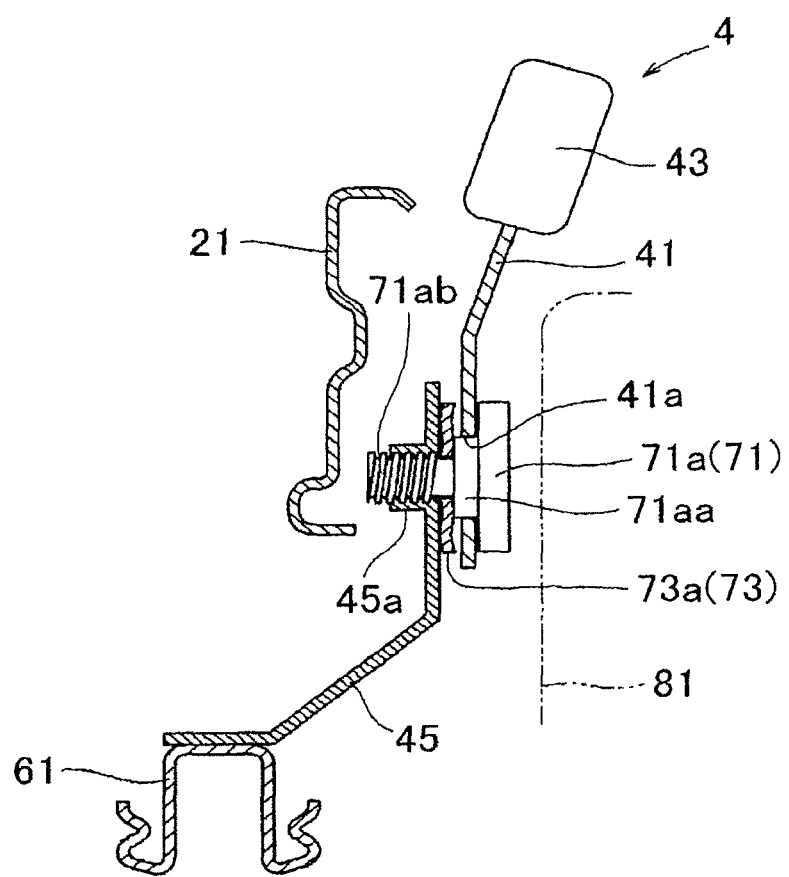
FIG. 2 is a view showing a structure around a buckle in a section taken along the line II-II in FIG. 1.

Next, the buckle bracket 45, on which the assembled body 51 is mounted, is explained. In the buckle bracket 45 of this embodiment, a hole provided in a flat plate is pressed, and burring machining is carried out to form a protruding part 45a that is cut and raised into a generally cylindrical shape, thereby forming the mounting hole 75. The mounting hole 75 is a portion to be meshed with the threaded part 71ab of the mounting bolt 71a. After the burring machining is carried out, an external thread part may be formed by threading an inner peripheral surface of the protruding part 45a. However, in this embodiment, the threading is not carried out. The burring machining is carried out so that an inner diameter of the mounting hole 75 becomes slightly smaller than a thread diameter of the mounting bolt 71a. In the case of this structure, the mounting bolt 71a is press-fitted to the mounting hole 75 while rotating the mounting bolt 71a, and, as the threaded part 71ab deforms the inner peripheral surface of the protruding part 45a, the mounting bolt 71a and the buckle bracket 45 are engaged with each other so as to mesh with each other (see FIG. 2). The buckle bracket 45 is a member that is mounted on the upper rail 61 by using the fastening member. When the buckle bracket 45 is mounted on the slide rail mechanism 6, the buckle bracket 45 is mounted so that a center axis of the mounting hole 75 and a center axis of the mounting member 71 are placed in a horizontal direction. Further, the buckle bracket 45 is arranged so as to cover an upper surface of the upper rail 61. In the buckle bracket 45, a part of a surface in contact with the upper rail 61, and a part of a surface in contact with the assembled body 51 are positioned to be generally orthogonal to each other. In this embodiment, the part of the surface in contact with the upper rail 61, and the part of the surface in contact with the assembled body 51 are not in contact with each other, and positioned to each other in a truncated chevron shape in a vertical sectional view. A region between these parts is connected so as to form an inclined surface (see FIG. 2). With this shape, it is possible to use a lower region of the buckle bracket 45 effectively. It is also possible to arrange a console box 81 at a position shown by a chain double-dashed line in FIG. 2.

With the manufacturing method for the vehicle seat 1 according to this embodiment, it is possible to mount the buckle 4 on the base by rotating the mounting member 71, which is provided in the assembled body 51, to the base. Therefore, it is not necessary to place hands on both side surfaces of the base, and an operation is carried out only from one side surface of the base, thereby improving efficiency of the mounting operation. Since the assembled body 51 and the base mesh with each other by screwing the assembled body 51 to the base while pressing the assembled body 51 against the base. Therefore, a nut is not needed, and the number of parts is reduced. It is also possible to reduce time required when mounting the buckle 4 to the base. Since a distal end of the threaded part 71ab of the mounting member 71 used for fixing the buckle 4 faces an inner side of the vehicle seat 1, it is possible to ensure a space on an outer side of the vehicle seat 1 compared to a case where the distal end of the threaded part 71ab of the mounting member 71 faces the outer side of the vehicle seat 1. This contributes to an increase in a size of the console box 81. Since the wave washer is used as the intermediate member 73, the washer 73a works as an appropriate spacer. Further, since it is possible to restrain a contact area of the washer 73a to neighboring members, compared to a flat washer, it is possible to turn the buckle 4 in an appropriate state. Further, as the washer 73a bites into the mounting bolt 71a, the washer 73a and the mounting bolt 71a are fixed to each other so as not to move to each other. Therefore, the washer 73a and the mounting bolt 71a are fixed to each other easily. An operation of combining the mounting bolt 71a and the washer 73a is an operation of forming the assembled body 51. This makes it possible to restrain an increase in working man hours. Since the washer 73a is used as the intermediate member 73, a thickness of the intermediate member 73 is small, thereby making it easier to ensure a space on the outer side of the vehicle seat 1.

One embodiment has been explained so far. However, the invention may be carried out in various types of forms other than the foregoing embodiment. For example, instead of mounting the buckle on the bracket fixed to the upper rail, the buckle may be mounted directly on the upper rail, or the buckle may be mounted on the cushion frame such as the lower arm. The bracket may also be mounted on the cushion frame such as the lower arm through the bracket. Instead of carrying out burring machining to form the base, it is possible to form a base that is able to be screwed to the mounting member 71 by welding an internal thread to a plate-like body having a through hole. The mounting member does not have to be a member with a threaded part like a bolt, and may have a shape to be fitted to the base, for example. The intermediate member does not have to be a washer, and a cylindrical elastic body may be used. The washer is engaged not only by being pressed in a longitudinal direction of the mounting bolt, but also by allowing an projecting portion, which is provided on an inner side of the washer, to be screwed to the threaded part of the bolt. The assembled body may be an integrated body of various types of members other than the intermediate member, the buckle, and the mounting member. The vehicle is not limited to a car, and may be a vehicle that flies in the air such as an airplane and a helicopter, as well as a vehicle that travels on and under the sea such a ship and a submersible.

What is claimed is:

1. A manufacturing method for a vehicle seat including a base, a buckle mounted on the base, a mounting member used for mounting the buckle on the base, and an intermediate member provided between the base and the buckle, the manufacturing method comprising:
   providing a plate with a through hole extending from the buckle, the mounting member configured to extend through the through hole in the plate and through the intermediate member, the intermediate member including a projecting portion;
   providing an assembled body formed by integrating the buckle, the mounting member, and the intermediate member, the integrating including fitting the mounting member through the plate through hole and through the intermediate member, the projecting portion of the intermediate member pressing against the mounting member and engaging the projecting portion by frictional force; and
   mounting the buckle on the base by combining the assembled body with the base, the plate positioned between the mounting member and the base.

2. The manufacturing method according to claim 1, wherein
   the assembled body is combined with the base by rotating the base and the mounting member relative to each other.

3. The manufacturing method according to claim 1, wherein
   burring machining is carried out on the base, the mounting member is provided with a threaded part, and a portion in which the burring machining is performed is deformed by the threaded part by rotating the mounting member relative to the portion while press-fitting the mounting member, so that the assembled body is combined with the base.

4. The manufacturing method according to claim 2, wherein
   burring machining is carried out on the base,
   the mounting member is provided with a threaded part,
   a portion in which the burring machining is performed is deformed by the threaded part by rotating the mounting member relative to the portion while press-fitting the mounting member, so that the assembled body is combined with the base.

* * * * *